(12) United States Patent
McLaughlin et al.

(10) Patent No.: US 7,676,126 B2
(45) Date of Patent: Mar. 9, 2010

(54) OPTICAL DEVICE WITH NON-EQUALLY SPACED OUTPUT PORTS

(75) Inventors: Sheldon McLaughlin, Ottawa (CA); Pierre D. Wall, Ottawa (CA)

(73) Assignee: JDS Uniphase Corporation, Milpitas, CA (US)

( * ) Notice: Subject to any disclaimer, the term of this patent is extended or adjusted under 35 U.S.C. 154(b) by 0 days.

(21) Appl. No.: 12/332,604

(22) Filed: Dec. 11, 2008

(65) Prior Publication Data

US 2009/0154874 A1    Jun. 18, 2009

Related U.S. Application Data

(60) Provisional application No. 61/012,960, filed on Dec. 12, 2007.

(51) Int. Cl.
    G02B 6/00 (2006.01)
    G02B 6/36 (2006.01)

(52) U.S. Cl. .......................... 385/18; 385/140

(58) Field of Classification Search ............. 385/15–20, 385/27, 31, 37, 129, 140
    See application file for complete search history.

(56) References Cited

U.S. PATENT DOCUMENTS

| | | | |
|---|---|---|---|
| 5,440,654 A | 8/1995 | Lambert, Jr. ................ 385/17 |
| 6,097,859 A | 8/2000 | Solgaard et al. ................ 385/17 |
| 6,498,872 B2 | 12/2002 | Bouevitch et al. .............. 385/24 |
| 6,549,699 B2 | 4/2003 | Belser et al. .................. 385/24 |
| 6,614,982 B2 * | 9/2003 | Barrett ........................ 385/140 |
| 6,707,959 B2 | 3/2004 | Ducellier et al. .............. 385/17 |
| 6,798,941 B2 | 9/2004 | Smith et al. ................... 385/18 |
| 6,801,305 B2 * | 10/2004 | Stierle et al. ................ 356/4.01 |
| 6,810,169 B2 | 10/2004 | Bouevitch ..................... 385/24 |
| 6,975,788 B2 | 12/2005 | Basavanhally et al. ........ 385/18 |
| 7,027,684 B2 | 4/2006 | Ducellier et al. .............. 385/24 |
| 7,142,744 B2 | 11/2006 | Walter et al. .................. 385/18 |
| 7,212,721 B2 | 5/2007 | Imai et al .................... 385/140 |
| 7,286,743 B2 * | 10/2007 | Soskind et al. .............. 385/140 |
| 2003/0021526 A1 * | 1/2003 | Bouevitch .................... 385/24 |
| 2006/0245685 A1 | 11/2006 | Ducellier .................... 385/18 |
| 2007/0160321 A1 * | 7/2007 | Wu et al. ...................... 385/24 |
| 2007/0242953 A1 | 10/2007 | Keyworth et al. ............. 398/48 |

\* cited by examiner

*Primary Examiner*—Akm E Ullah
(74) *Attorney, Agent, or Firm*—Teitelbaum & MacLean; Neil Teitelbaum; Doug MacLean

(57) ABSTRACT

The invention relates to multiport routing devices for routing optical signals which also provide beam attenuation by imparting a controllable offset between an optical beam and a selected optical port. A multiport optical routing device of the present invention has a plurality of non-equally spaced optical ports disposed in a row to enable beam offset for attenuation without substantially increasing optical crosstalk between adjacent ports in a compact port arrangement.

14 Claims, 10 Drawing Sheets

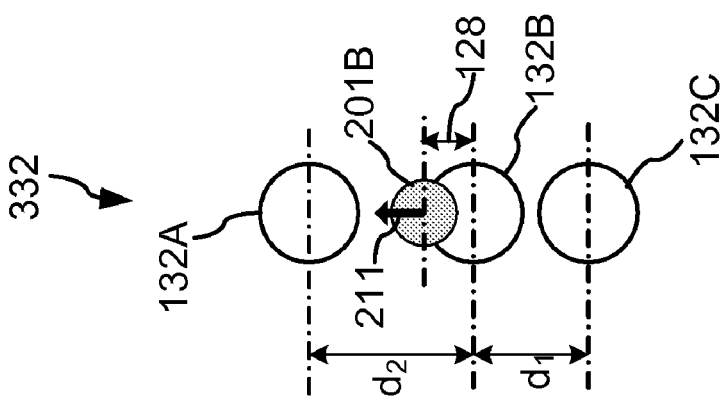
FIG. 3D
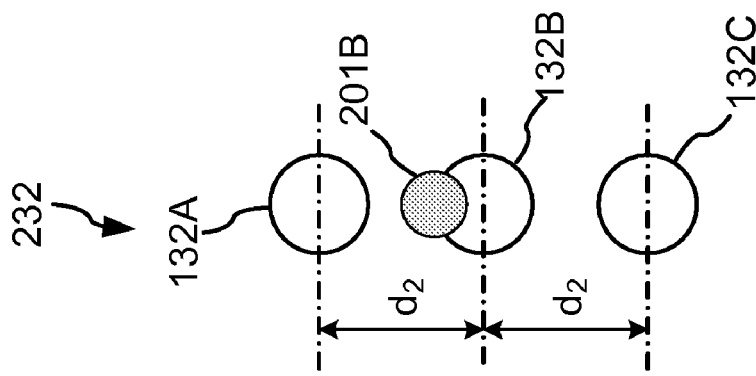
FIG. 3C
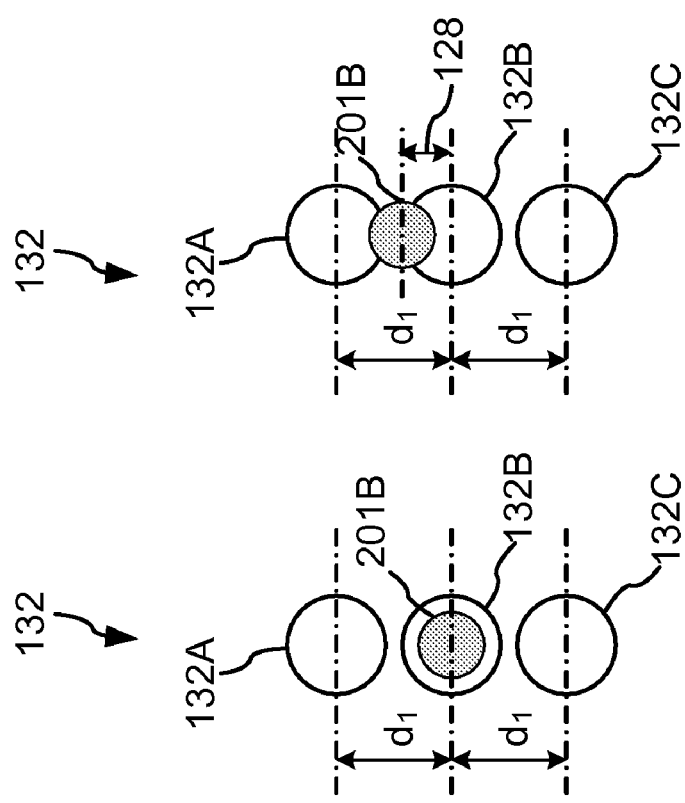
FIG. 3B
FIG. 3A

OPTICAL DEVICE WITH NON-EQUALLY SPACED OUTPUT PORTS

CROSS-REFERENCE TO RELATED APPLICATIONS

The present invention claims priority from U.S. Provisional Patent Application No. 61/012,960 filed Dec. 12, 2007, entitled "Non-equal port spacing in WSS", which is incorporated herein by reference for all purposes.

TECHNICAL FIELD

The present invention relates to optical devices for routing and modifying optical signals, and in particular to optical devices providing variable beam attenuation with non-equally spaced output ports.

BACKGROUND OF THE INVENTION

Optical routing devices such as optical switches and, in particular wavelength selective switches (WSS), are used in optical communications and optical measurement applications. Conventional optical routing devices, such as those disclosed in U.S. Pat. No. 6,097,859 issued Aug. 1, 2000 to Solgaard et al; U.S. Pat. No. 6,498,872 issued Dec. 24, 2002 to Bouevitch et al; U.S. Pat. No. 6,707,959 issued Mar. 16, 2004 to Ducellier et al; U.S. Pat. No. 6,810,169 issued Oct. 26, 2004 to Bouevitch, and U. S. Pat. Publication No. 2007/0242953 published Oct. 18, 2007 to Keyworth et al, which are incorporated herein by reference, separate a multiplexed optical beam into constituent wavelengths with a dispersive element, and then direct individual wavelengths or groups of wavelengths, which may or may not have been modified, back through the device to a desired output port.

In a typical WSS the input and output optical ports are faces of optical fibers that are arranged in an array wherein fibers are equally spaced and held in position in a fiber array unit (FAU). The front end of the device may further include a polarization diversity unit for ensuring the beam of light routed within the device has a single state of polarization. The back end of the device typically includes a switching engine, also referred to herein as a beam director, wherein individually controllable devices are used to redirect selected wavelengths back to one of several output ports.

An optical beam emerging from the FAU is transformed by the WSS optics into multiple beams according to the wavelength, and made to converge at the switching engine. The WSS optics is effective in mapping the optical fiber position in the FAU to a beam angle at the switching engine. The switching engine operates by imparting a controllable tilt to an incoming beam, to redirect it to an output port. Possible switching engine technologies include tiltable micro-mirrors of a micro electromechanical switch (MEMS) and liquid crystal on silicon (LCoS) phase arrays. The switching engine is typically voltage controlled, with the amount of tilt generally increases with the applied voltage.

In addition to switching between ports, it may be desirable for the switching engine to attenuate optical signals. This variable attenuation may be accomplished by tilting the beam slightly away from an angle corresponding to an optimal optical alignment with a selected output fiber port, such that the beam impinges thereupon with some controllable offset and suffers a coupling loss into the output fiber. Optical switches wherein signals are variably attenuated by tilting micro-mirrors away from the optimal optical alignment with a target optical port are disclosed for example in U.S. Pat. No. 6,798,941 to Smith et al and U.S. Pat. No. 7,142,744 to Walter et al, which are incorporated herein by reference.

Unfortunately, when an output optical beam is offset from its optimal alignment with a target output optical port in a multiport routing device, the beam may come into a partial alignment with an adjacent optical port, increasing the amount of light leaking into the non-selected adjacent port, resulting in an undesirable optical crosstalk between adjacent optical ports in the array.

SUMMARY OF THE INVENTION

Accordingly, an object of the present invention is to overcome the shortcomings of the prior art by providing an improved optical routing device wherein variable attenuation of routed optical signals is affected without inducing optical crosstalk between adjacent output ports and without adding to the device complexity.

In accordance with the invention, there is provided a multiport optical routing device for routing and modifying an optical signal, comprising an input optical port for receiving the optical signal, a plurality of output optical ports disposed in a row comprising first, second and third consecutive optical ports, and a beam director optically coupled to the input port for receiving at least a portion of the optical signal therefrom and for directing said at least a portion of the optical signal as a light beam at a controllable angle for coupling into one of the output optical ports, wherein the first, second and third consecutive optical ports are non-uniformly spaced with a first distance $d_1$ between the first and second output optical ports that differs from a second distance $d_2$ between the second and third output optical ports by at least 10%.

In accordance with one aspect of this invention, each three consecutive optical ports from the plurality of output optical ports are non-equally spaced with inter-port distances between adjacent ports differing by at least 10%.

In accordance with one aspect of the invention, the beam director is adjustable to direct the light beam along an optical path towards the second output optical port for coupling thereinto, and is further adjustable to at least partially shift the light beam away from an alignment with the second optical output port towards one of the first and third output optical ports that is distanced farther away from the second optical port so as to provide a controllable optical loss for light coupled into the second optical port without causing light of the light beam to leak into adjacent optical ports.

BRIEF DESCRIPTION OF THE DRAWINGS

The invention will be described in greater detail with reference to the accompanying drawings which represent preferred embodiments thereof, in which like elements are indicated with like reference numerals, and wherein:

FIGS. 3A and 3B are end-on views of three consecutive equally spaced optical ports in a multi-port optical routing device without a provision for beam offset for attenuation illustrating beam-port alignment without and with an offset;

FIG. 3C is an end-on view of three consecutive equally spaced optical ports in a multi-port optical routing device with an increased inter-port spacing providing for a beam offset for attenuation;

FIG. 3D is an end-on view of three consecutive non-equally spaced optical ports in a multi-port optical routing device according to one embodiment the present invention;

DETAILED DESCRIPTION

The present invention relates to multiport optical routing devices for routing and modifying optical signals, which utilize beam offset or beam misalignment at optical ports for affecting variable attenuation of output optical signals; it provides an improvement according to which at least some of the optical ports of the device are disposed in a row forming a one dimensional (1D) array of optical ports with non-equal port spacing, so that there is three consecutive optical ports for which a center optical port is disposed substantially closer to one of its neighbors than to the other, thereby providing room for offsetting or shifting an incoming optical beam slightly away from an optimal alignment with the center port to provide variable optical coupling thereinto without causing undesirable leaking of the beam light into adjacent optical ports.

The invention can be utilized in a variety of routing device platforms wherein the direction of the beam offset for optical signal attenuation coincides with, or at least has a projection upon, a beam switching direction, i.e. the direction in which the beam moves when it is switched to another output port, so that offsetting a beam for the purpose of attenuation moves the beam closer to an adjacent output port.

Embodiments of the invention will now be described with reference to wavelength dispersive optical routing devices, also referred to as wavelength selective switches (WSS) wherein the optical ports are in the form of optical waveguides such as optical fibers arranged in a 1D optical fiber array.

Figure 1:
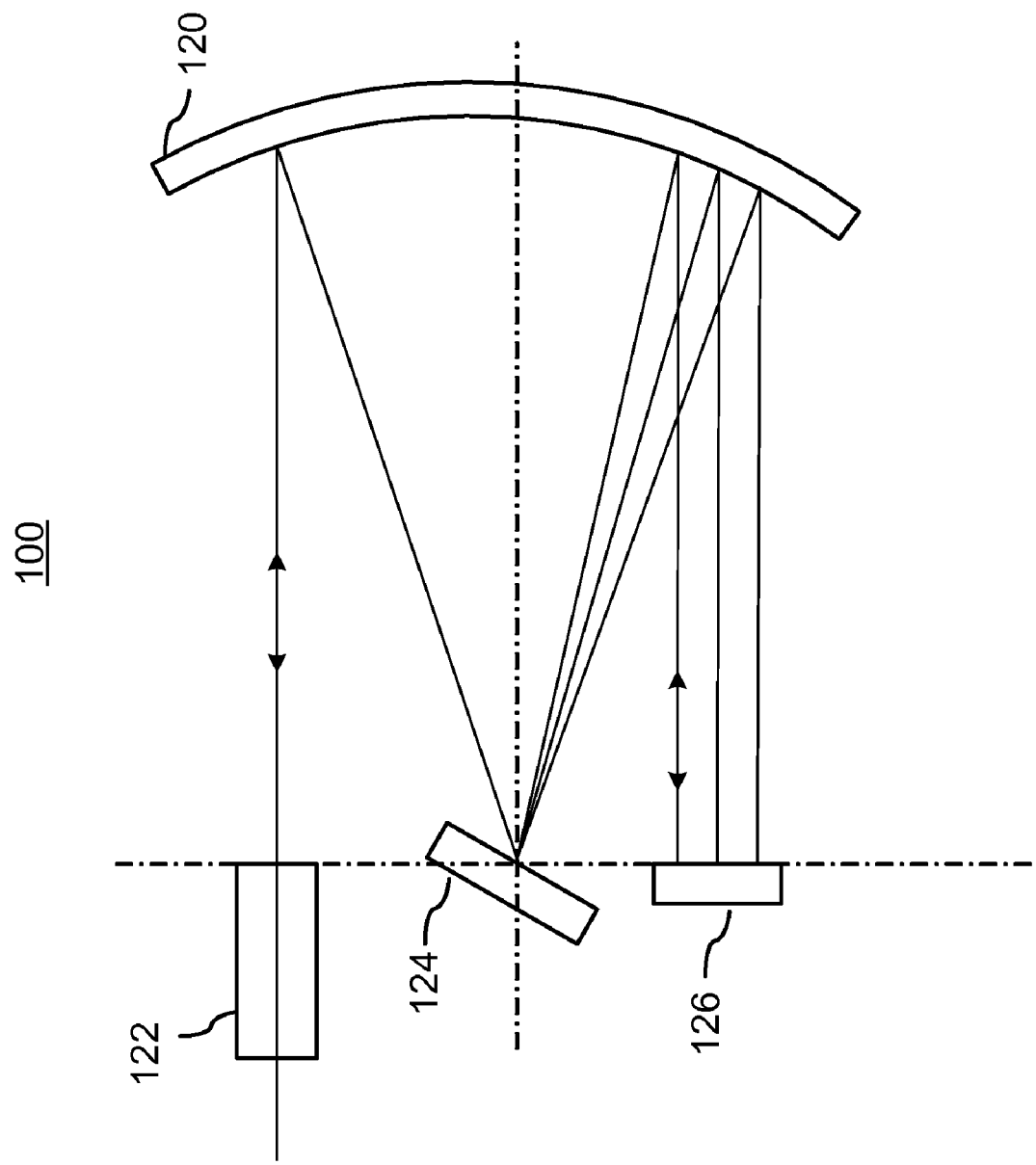
FIG. 1 is a schematic representation of a top view of one conventional multiport optical routing device with a dispersive element.

FIG. 1 illustrates a top view of one typical WSS platform 100 in which the output signals may be attenuated by offsetting beams in the switching direction. The WSS 100 is disclosed in U.S. Pat. No. 6,707,959 to Ducellier et al, which is assigned to the assignee of the instant application and is incorporated herein by reference. In the WSS 100, a light redirecting element having optical power in the form of a spherical reflector 120 receives a beam of light from a front-end unit 122. The spherical reflector 120 reflects the beam of light to a diffraction grating 124, which disperses the beam of light into its constituent wavelength channels. The wavelength channels are again redirected by the spherical mirror 120 to a backend unit 126, which is also referred to herein as a beam director.

Figure 2:
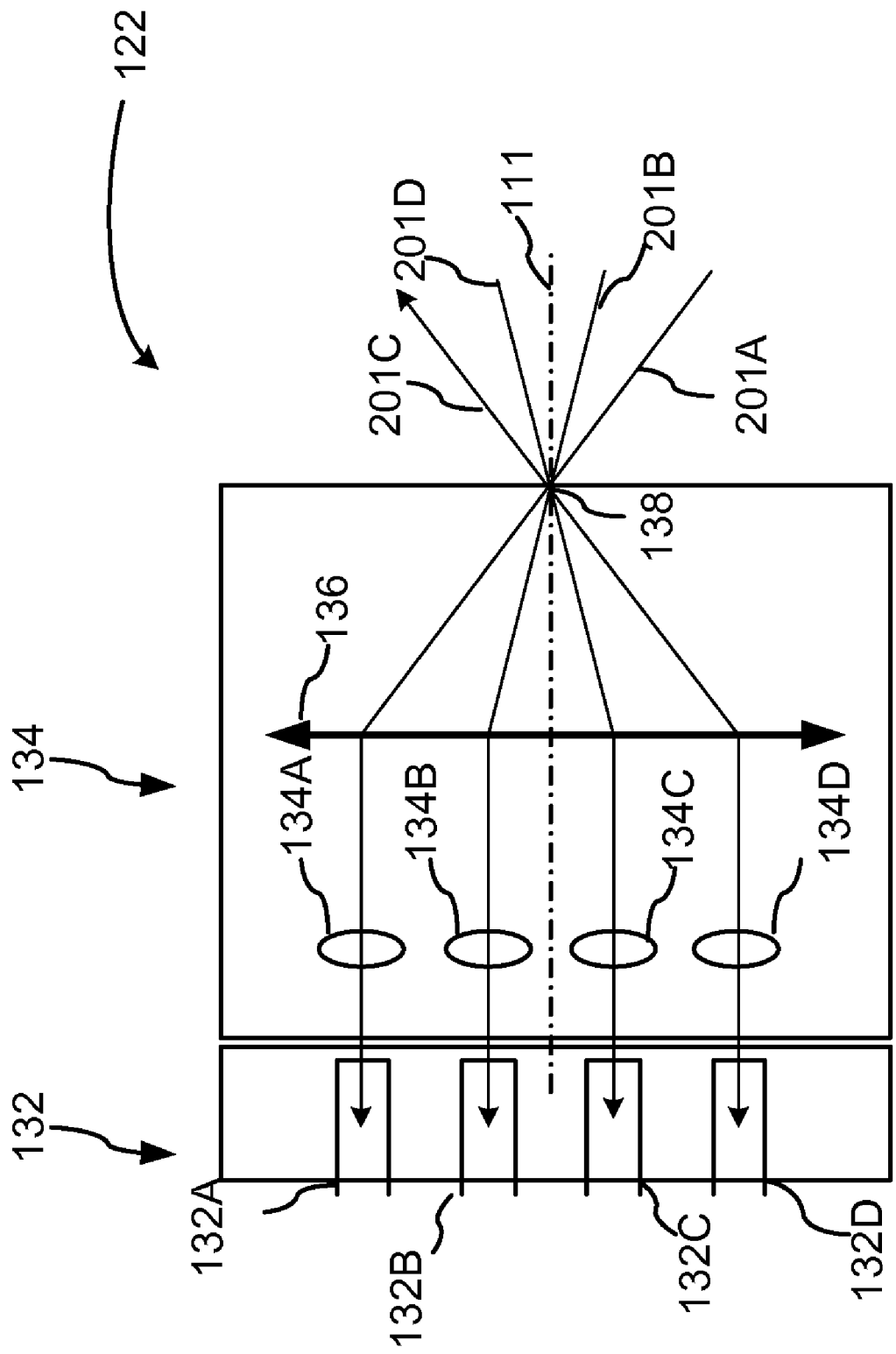
FIG. 2 is a schematic side view of a prior-art front-end unit of the device shown in FIG. 1.

The front end unit 126 according to prior art is illustrated in FIG. 2 in further detail and includes equally spaced input/output optical ports 132A to 132D disposed in a row, each of which may have a corresponding lens 134A to 134D, respectively, forming a lens array 134; although four ports are shown, a WSS may have any number of ports greater that two. An angle to offset lens 136, also referred to herein as the switching lens, converts the lateral offset of the input/output ports 132A to 132D relative to an optical axis 111 into an angular beam offset at a point 138, which is imaged by the spherical reflector 120 onto the beam director 126. The lens array 134 is optional and can be absent in some embodiments. The optical ports 132A-C may be coupled to a 1D fiber array, and may be ends of single mode optical fibers laid out in a row in equally spaced parallel v-groves in a fiber array unit (FAU) 132.

The beam director 126 may include an actuation array of beam deflecting elements, which may be in the form of a micro-electro-mechanical (MEMS) array of tilting mirrors which can be used to steer each of the demultiplexed beams to one of several positions corresponding to a desired output port 132. The beam angle introduced at the back end unit 126 is then transformed by the switching lens 136 to a lateral offset corresponding to the desired input/output fiber 132A to 132D. Alternatively, a liquid crystal phased array (LC or LCoS, if incorporated on a silicon driver substrate) can be used as the beam director 126 to redirect the light, as described for example in U.S. Pat. No. 6,707,959 that is incorporated herein by reference.

In operation, an optical multiplexed signal is launched into the front-end unit 122 and optionally passes through a polarization beam splitter and a waveplate (not shown) to provide two beams of light having the same state of polarization. Each of the two beams of light is transmitted to the spherical reflector 120 and are reflected therefrom towards the diffraction grating 124. The diffraction grating 124 separates each of the two polarized beams into a plurality of channel sub-beams of light having different central wavelength, each channel sub-beam formed of a different spectral portion of the input optical signal, and disperses them in a dispersion plane, which is in the plane of, or parallel to or at an acute angle to the plane of, FIG. 1. In a preferred embodiment the dispersion plane is generally perpendicular to the plane of FIG. 2 in which the optical fiber ports 132A-132D are spread out, also referred to herein as the switching plane, to make switching between different ports less wavelength dependent, although dispersing the wavelengths in the plane of FIG. 2, i.e. the switching plane, is also possible. The plurality of channel sub-beams are transmitted to the spherical reflector 120, which redirects them to the MEMS 126, where they are incident upon respective micro-mirrors as spatially separated spots corresponding to individual spectral channels.

Each channel sub-beam can be reflected by a respective mirror or a group of LC cells of the beam director 126 backwards along the same path or a different path, which extends into or out of the page in FIG. 1 to the array of fibers 132, which would extend into the page generally normally to the dispersion plane. Alternatively, each channel sub-beam can be reflected backwards along the same path or a different path, which extends in the plane of the page of FIG. 1. The sub-beams of light are transmitted, from the beam director 126, back to the spherical reflector 120 and are redirected to the diffraction grating 124, where they are recombined and transmitted back to the spherical reflector 120 to be transmitted to a predetermined input/output port 132A, B, C or D shown in FIG. 2.

Referring to FIGS. 1 and 2, each of the micro-mirrors of the beam director 126 is rotatable to reflect the channel sub-beam incident thereupon at a controllable angle, so as to direct it, with the aid of the spherical mirror 120 and the switching lens 136, to a selected one of the output optical ports 132A-D, as illustrated by beams 201A-201D that are shown to couple in or out respective output ports 122A-122C. By tilting a micro-mirror so as to tilt a respective channel sub-beam slightly away from an angle corresponding to an optimal alignment with the selected one of the optical ports 132A-D, an optical coupling of a sub-beam into a respective selected port can be reduced, as the channel sub-beam will impinge upon the selected port with an offset, thereby providing a controllable attenuation to light coupled into the selected port.

In an embodiment wherein the switching plane is orthogonal to the dispersion plane it may be preferable that the attenuation is achieved by tilting the beam in the switching plane, i.e. in the plane of FIG. 2, which coincides with or is parallel to the plane of the port array 132. However, in this case tilting the channel sub-beam away from the selected port will move it towards an adjacent optical port. This is illustrated in FIGS. 3A and 3B, which are face-on depictions of a portion of the FAU 132 showing the three consecutive optical ports 132A-C disposed in a row with equal spacing, or distance, $d_1$ therebetween; also schematically shown is a cross-section of the beam 201B at a beam entrance plane of the FAU 132. Note that in the context of this specification, the terms "distance between ports" and "spacing between ports" are used interchangeably to mean a distance between optical axes of adjacent optical ports.

FIG. 3A illustrate the optimal alignment of the beam 201B with the selected optical port 132B of the FAU 132, with the optimal alignment corresponding to a substantially zero offset between optical axes thereof, so that substantially all light of the beam 210B is coupled into the selected output port 132B.

In FIG. 3B, the beam 210B is shown with a slight offset 128 from the port 132B so as to reduce a fraction of the light coupled into the selected port 132B and provide a desired degree of attenuation for the coupled light. However, the beam 210B is thereby moved closer to the adjacent port 132A so that a portion of light of the beam 210B may now be coupled into the adjacent port, resulting in an undesirable leaking of the optical signal directed to the port 132A into the adjacent port 132B, and an optical crosstalk between the ports.

Referring now to FIG. 3C, the distance between ports 132A-C is increased to a larger value $d_2$ in a FAU 232, so as to reduce or eliminate this undesirable optical crosstalk between ports when the beam is offset for attenuation. Here, $d_2$ should be sufficiently large to prevent light of the beam 201B from coupling into the adjacent port 132A beyond a pre-defined small value at maximum target attenuation. The distance between ports can be expressed in term of the radius ω of the optical beam 201 at the entrance to the respective port; if the beam intensity profile is approximately Gaussian, the beam radius may be measure at the $1/e^2$ intensity level. By way of example, the ports may be separated by $d_1=4\omega$ with no provision for attenuation, and by $d_2=6\omega$ with a provision for a maximum attenuation by 15 dB and a condition that the inter-port crosstalk must not exceed −35 dB.

However, increasing of the inter-port distance has an undesirable consequence of increasing the overall size of the port array 232, i.e. the distance between ports at the opposite ends of the array 232, resulting in a larger required tilt angle of the micro-mirrors of the beam director 126, and a larger required maximum switching voltage that have to be applied to the MEMS mirrors.

Figure 4:
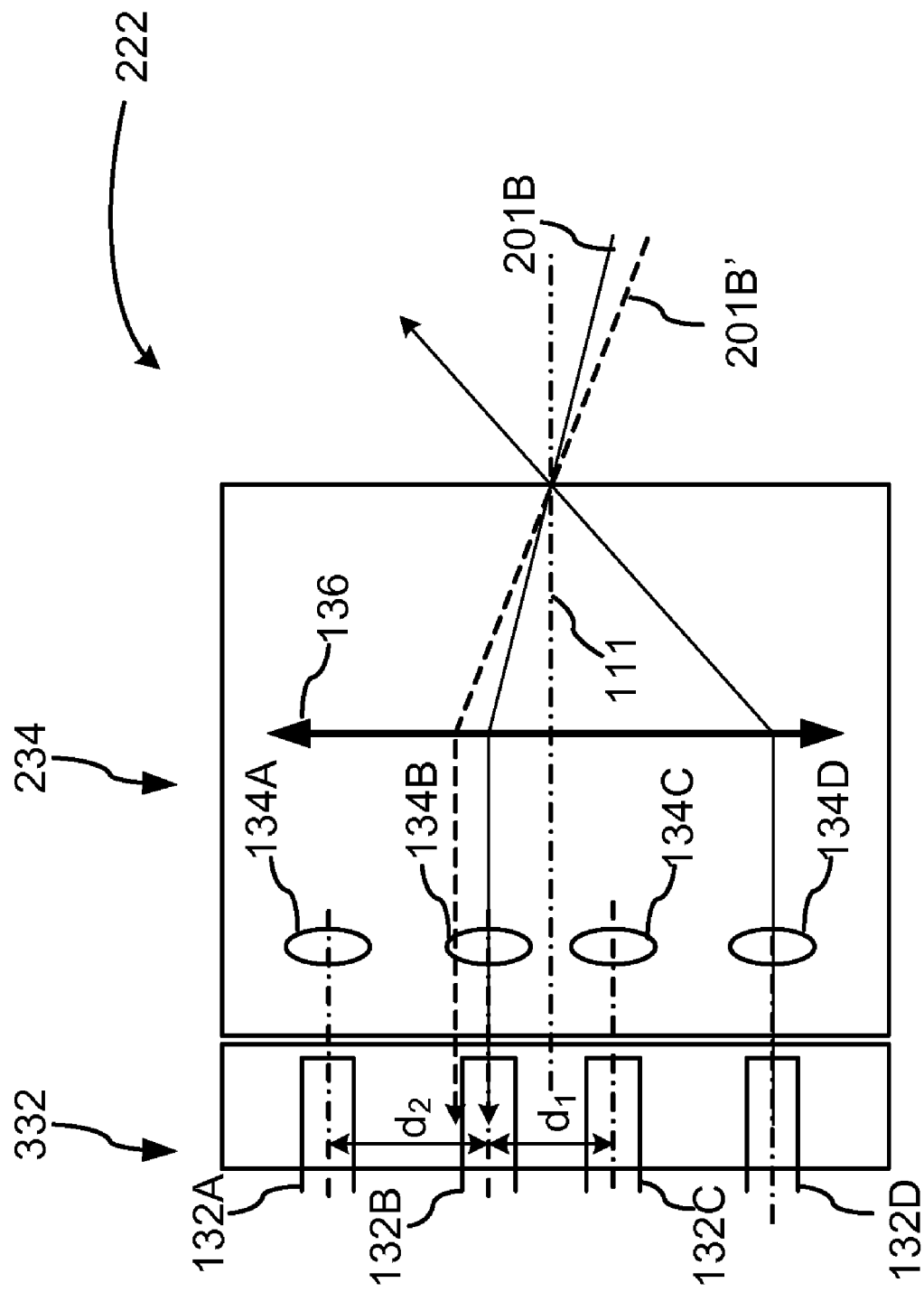
FIG. 4 is a schematic side view of a front-end unit of a multiport optical routing device having non-equally spaced ports according to one embodiment of the present invention.

Therefore, one aspect of the present invention provides a FAU 332 having non-equally spaced optical ports as shown in FIG. 3D, and a front-end unit 222 shown in FIG. 4 utilizing the FAU 332. In the FAU 332, the three consecutive ports 132A-132C are disposed in a row and are separated from each other by two non-equal distances $d_2$ and $d_1$, wherein one of these distances is greater than the other by at least 10%, and preferably by about 20% or more depending on the desired maximum attenuation and a diameter of the beam. In the shown example, the first port 132A and the second, or middle port 132B are disposed at the distance $d_2$ from each other, which is greater than the distance $d_1$ between the middle port 132A and the third port 132B. The greater of the two distances, which is $d_2$ in the shown embodiment, should be sufficiently large so that the beam 201B is not coupled into the next adjacent port 132A when the beam offset 128 corresponds to a maximum desired attenuation of the beam coupled into the port 132B. In some embodiments, the distance $d_2$ may be selected so that the ratio $d_2/d_1$ is between 1.2 and 1.6.

In operation, when the optical signal into the port 132B needs to be attenuated, the beam 201 at the entrance to the FAU 332 is moved towards the adjacent port 132A that is disposed farther away than the opposite adjacent port 132C, as indicated by the arrow 211, i.e. the beam is moved into the larger of two inter-port spacings separating the selected middle port 132B from the two adjacent ports 132A, C closest thereto. Accordingly, the distance $d_1$ between the middle port 132B and its other adjacent port 132C can be chosen without allowance for attenuation.

By way of example, in one embodiment the first inter-port distances $d_1$ is between 100 μm and 150 μm, and the second larger inter-port distance $d_2$ is between 150 and 300 μm. In another embodiment, the first inter-port distances $d_1$ is between 200 mm and 300 μm, and the second larger inter-port distance $d_2$ is between 300 and 600 μm.

With reference to FIG. 4, the front-end unit 222 that utilizes the FAU 332 of the present invention may include a micro-lens array 234 wherein the micro-lenses 134A-134D are non-equally spaced so as to be aligned with respective optical ports of the FAU 332, but is otherwise similar to the front-end unit 122 shown in FIG. 2. Optical beams 201B and 201B' are shown by way of example to illustrate optimal beam-port alignment, and an alignment with a beam offset for attenuation, respectively.

Figure 5:
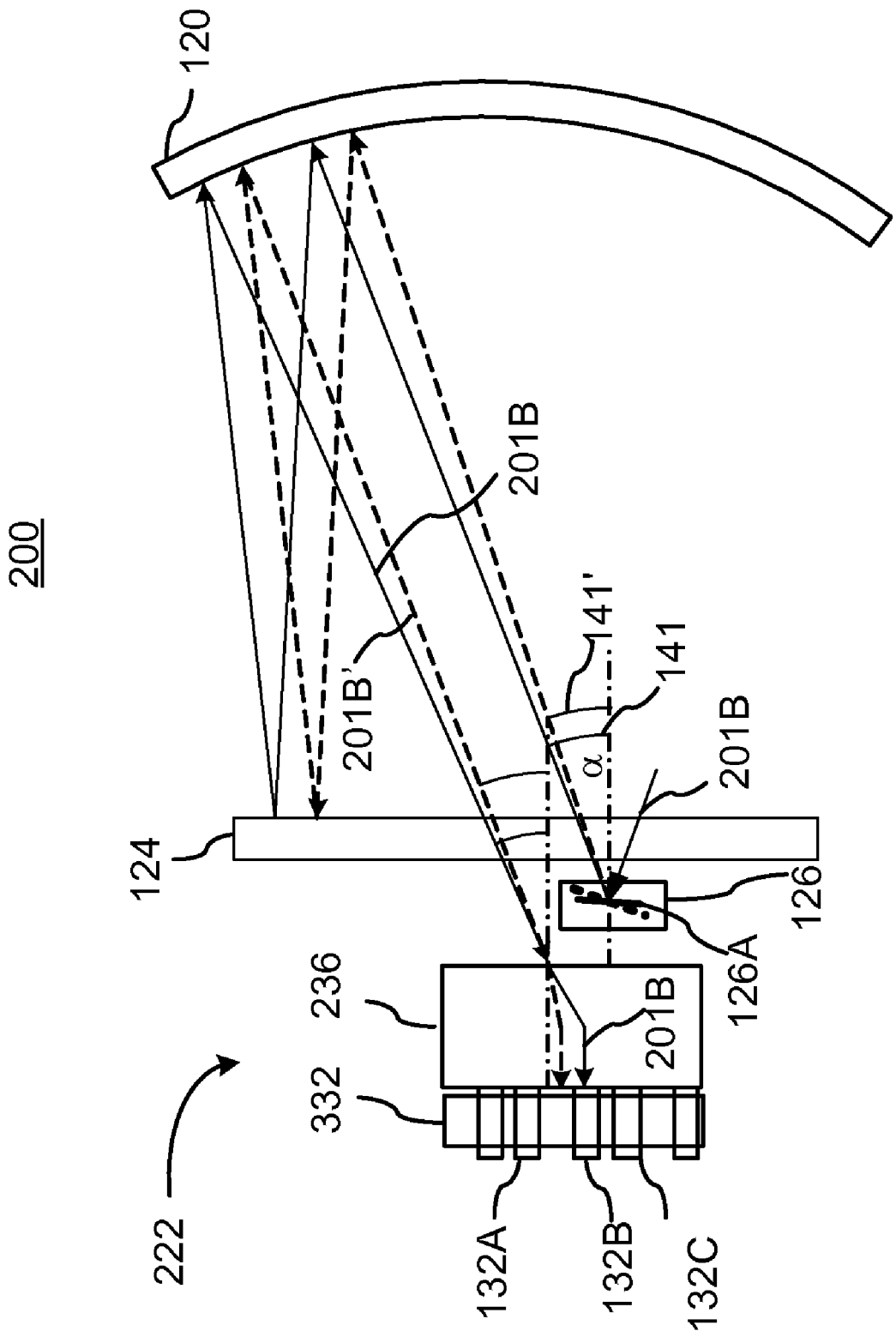
FIG. 5 is a schematic side view of one embodiment of a multiport optical routing device having non-equally spaced ports according to the present invention.
Figure 6:
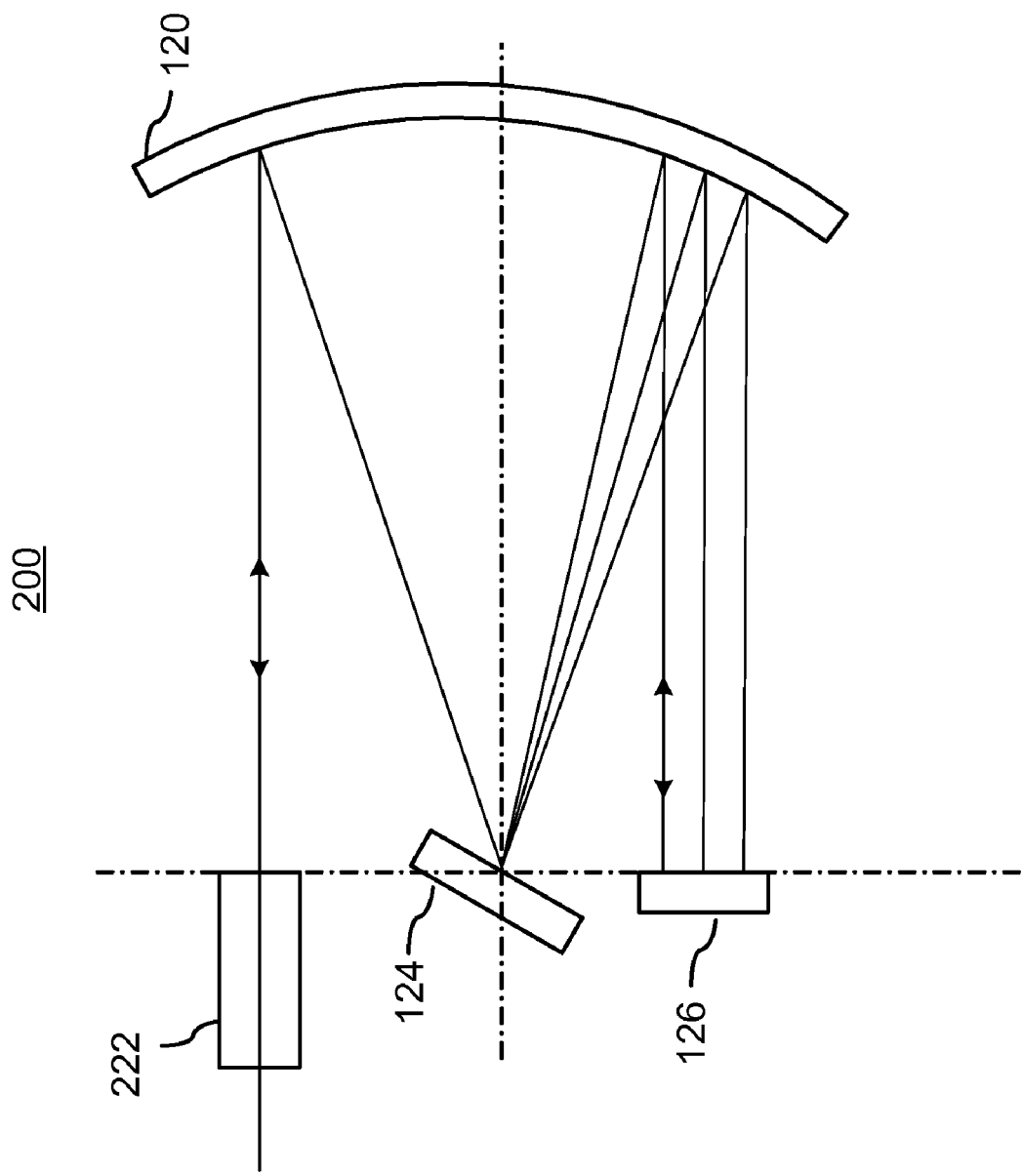
FIG. 6 is a schematic top view of the multiport optical routing device shown in FIG. 5 incorporating the front-end unit with non-equally spaced optical ports.

FIGS. 5 and 6 provide an example of a multiport routing device 200 according to one embodiment of the present invention. The multiport routing device 200 may be similar to the WSS 100 in all respects except that it utilizes the front-end unit 222 with non-equally spaced optical ports in place of the front-end unit 122 described hereinabove with reference to FIG. 2.

Specifically, FIG. 5 shows the side view of the device 200, with only a single MEMS micro-mirror 126A of the beam director 126 shown for illustration. The FAU 332 includes the three consecutive output ports 132A, 132B and 132C, which are referred to herein as the first, second, and third optical ports, respectively, and are disposed in a row in the plane of FIG. 5, which coincides with or is parallel to the switching plane of the device. The diffraction grating 124 and the MEMS micro-mirror 126A are preferably disposed in the focal plane of the spherical mirror 120, but are shown with a slight offset therefrom for clarity. In FIG. 5, the beam director 126 is adjustable to orient the MEMS micro-mirror 126A to deflect a beam 201B at a controllable angle 141 so as to direct it to couple into any of the ports 132 after twice reflecting from the spherical mirror 120 and once—from the grating 124. By way of example, the beam director 126 is shown to direct the beam 201B along an optical path shown by a respectively labeled solid line for coupling into the port 132B, which is selected by the chosen orientation of the micro-mirror 126A. The orientation of the micro-mirror 126A may be further adjusted to at least partially tilt the light beam 201B away from an alignment with the second optical output port towards one the adjacent optical ports that is distanced farther away from the selected second optical port 132B, so as to affect a variable optical loss for light passing through the second optical port 132B without causing light of the light beam 201B to leak into any of the adjacent optical ports. Light beam 201B can be tilted to impinge upon the selected port 132B with an offset, as illustrated by the beam 201B' shown with a dashed line. In the shown example, the micro-mirror 126A of the beam director 126 is tilted clock-wise which is suitable to move the beam 201B at the FAU 332 towards the port 132A, which is the farthest from the selected port of the two closest adjacent ports 132A and 132C.

FIG. 6 shows a top view of the device 200; which is similar to the top view of the WSS 100 shown in FIG. 1, except for the front-end unit 222 shown to replace the prior-art front unit 122 in accordance with the present invention.

FIGS. 5, 6 illustrate just one particular embodiment of the multi-port routing device of the present invention with non-equal port spacing. It will be appreciated that other types of multi-port optical routing devices, which provide variable optical attenuation by moving a beam of light directed to a selected optical port closer to an adjacent output port, will benefit from the use of non-equal spacing of the optical ports as described hereinabove.

Figure 7:
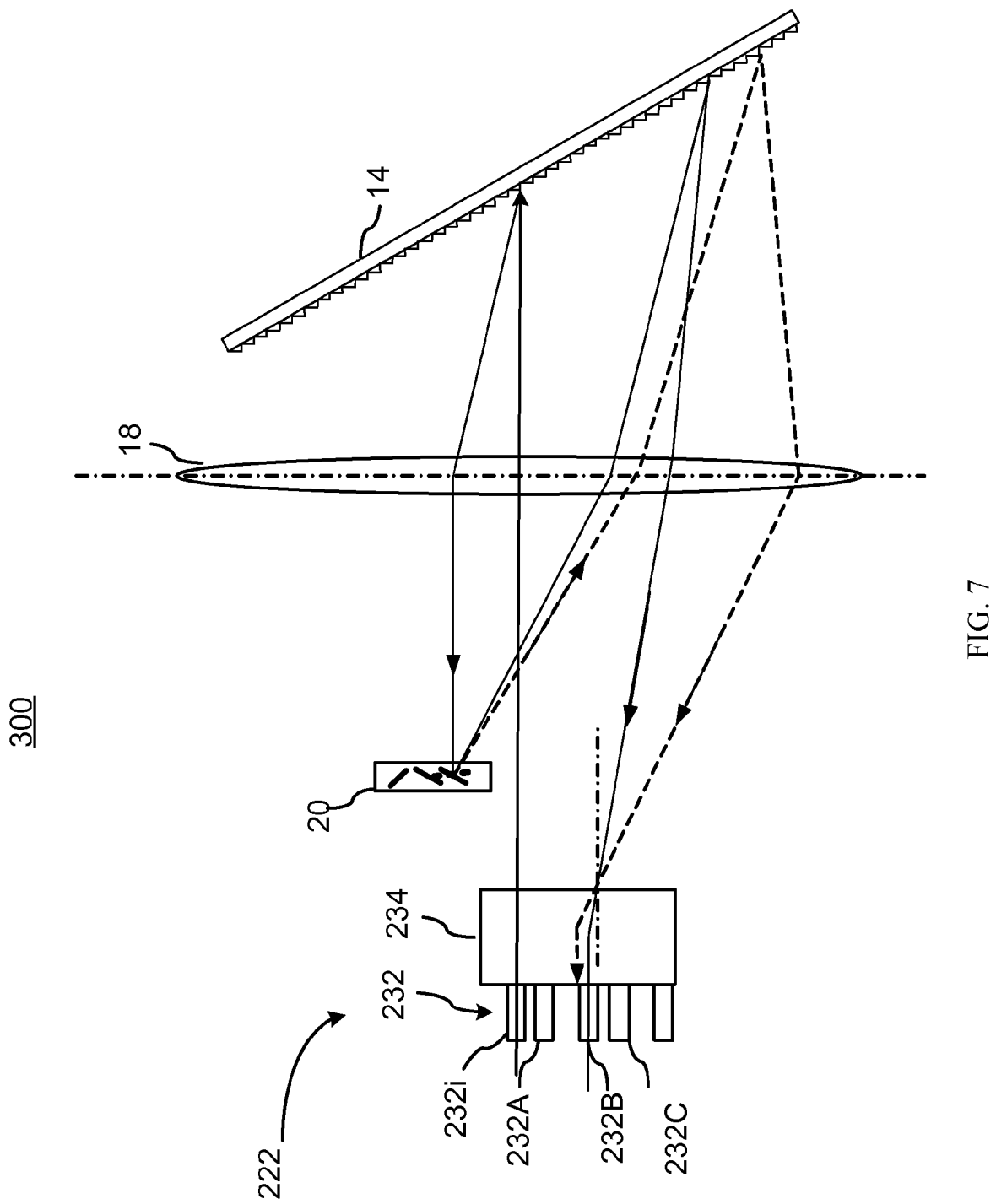
FIG. 7 is a schematic side view of another embodiment of a multiport optical routing device having non-equally spaced ports according to the present invention.

For example, FIG. 7 shows a WSS 300 according to another exemplary embodiment of the invention. The WSS 300 is based on a known switching platform that is described for example in U.S. Patent Application No 2006/0245685 to Ducellier et al, which is incorporated herein by reference. However, while the device described in the '685 application has evenly-spaced ports, the WSS 300 utilizes the front-end unit 222 with N non-equally spaced ports 232 disposed in a row. In the shown example the WSS 300 is configured as a 1×5 switch with a MEMS-based beam director 20, a diffraction grating 14, and a coupling lens 18 having an optical power for optically coupling the optical ports 18, the grating 14 and the beam director 20. One difference between the WSS 300 and WSS 200 described hereinabove is that in the WSS 300 the switching and dispersion planes are substantially parallel coinciding with the plane of FIG. 7.

An optical port 232$i$ is aligned with an optical axis of the WSS 300 and may be used as an input port, while the 4 others may be used as output ports. In operation, an input wavelength-multiplexed optical signal 301 from the input optical port 232$i$ is passed to the grating 14, and upon deflecting therefrom is de-multiplexed into a plurality of wavelength channel beams having differing central wavelength, each impinging on a corresponding MEMS mirror of the beam director 20. The MEMS mirrors can tilt in the plane of the dispersion to route the wavelength channels to alternate locations on the diffraction grating 14. The images of these alternate locations through the coupling lens 18 and the switching lens 236 can be made to precisely align to one of the optical ports 132, thus the wavelength channels is made to couple to a selectable optical port. By way of example, a solid line in FIG. 7 illustrates an optical path of a de-multiplexed beam 311 that is directed by a corresponding MEMS mirror of the beam director 20 to align with the second optical port 132B disposed between the first optical port 132A and the third optical port 132C at the non-equal distances $d_2$ and $d_1$ therefrom, respectively. By tilting the respective mirror of the MEMS beam director 20 clock-wise, the beam 311 may be made to follow a slightly different optical path so as to arrive at the FAU 332 with a slight offset with respect to the target port 132B, as illustrated by a dashed line in FIG. 7, so at to provide a desired degree of attenuation for light coupled into the port 132B. Since the beam is offset towards the port 132A that is positioned farther apart from the target port 132B, substantially no light of the beam 201B is leaked into the adjacent port. It will be appreciated that while offsetting the beam 201B in the direction of the first ports 132A is accomplished in the shown example by tilting the MEMS mirror 20 clock-wise, beams of different wavelength may require tilting a respective mirror of the beam director 20 counter-clock-wise in order to move the respective beam towards the larger inter-port spacing. It will be further appreciated that although only 5 optical ports 132 are shown, the FAU 332 may include any number of optical ports greater than 2.

Figure 8A:
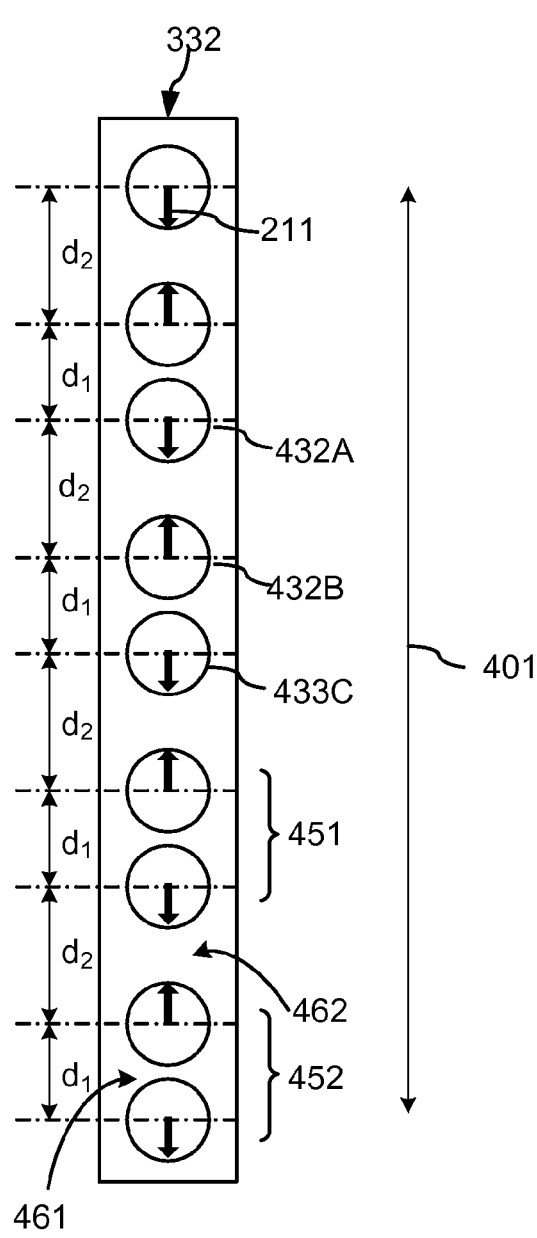
FIGS. 8A and 8B are end-on views of exemplary 9-port fiber array units with non-equal and equal port spacing, respectively, for use in multiport optical routing devices providing for variable optical signal attenuation by beam offset.
Figure 8B:
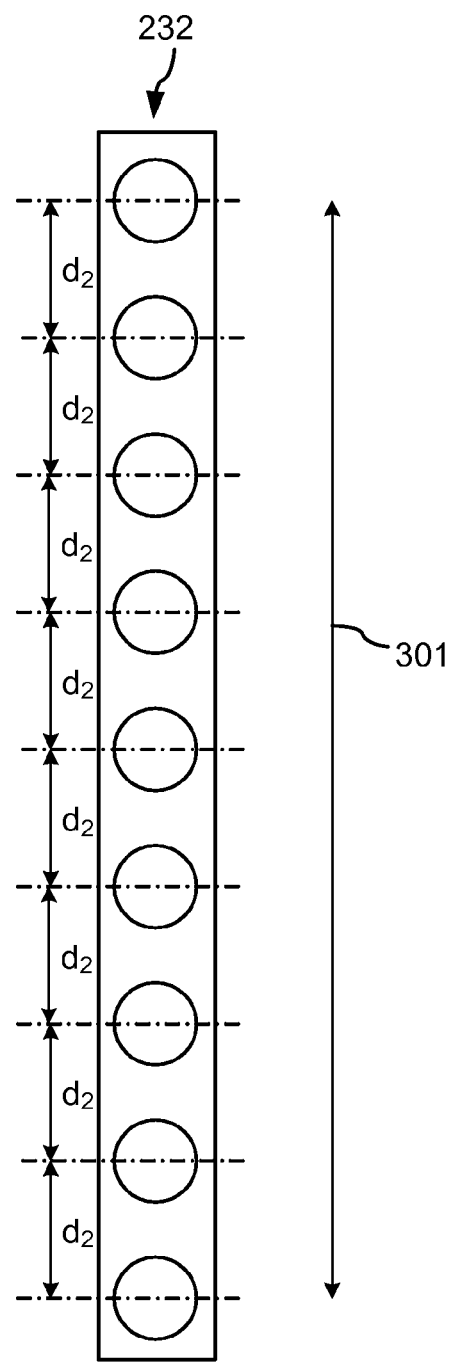

For example, FIG. 8A illustrates an embodiment of the FAU 332 having 9 optical ports disposed in a row shown in a vertical orientation, including three non-equally spaced consecutive ports 432A, 432B and 432C, of which first two adjacent ports 432A and 432B are spaced apart by the distance $d_2$ that is greater than the distance $d_1$ separating the second two adjacent ports 432B and 432C. In the shown embodiment, each optical port is spaced apart from two nearest adjacent optical ports by two non-equal distances that differ by at least 10%, and preferably by between 20 and 60%. The direction of beam offset for attenuation for each port is indicated by thick arrows 211. FIG. 8B provides for comparison a FAU 232 having the same number of optical ports that are equally spaced according to the prior art, with inter-port distances $d_2$ selected to allow a similar beam offset for attenuation without port cross-coupling.

Advantageously, the non-equally spaced optical ports of the present invention enable to reduce the port array size and the maximum beam switching distance, which is indicated in FIGS. 8A,B with arrows 401 and 301, respectively. By way of example, $d_1$ is 100 μm, $d_2$ is 150 μm, and the maximum switching distance between opposite edge ports is reduced in an optical routing device such as WSS 200 utilizing the FAU 332 by 200 μm or about 15% compared to a similar optical routing device utilizing the FAU 232, advantageously resulting in a reduction of a maximum switching voltage, or enabling adding another port within the angular range of FAU 232. Reducing the total switching angle range required to switch over a given number of ports is advantageous also because the angle range achievable from a beam director such as a MEMS mirror is limited. As a further advantage, reducing the switching angle reduces the numerical aperture of the optical system in the switching direction, which helps to reduce the effect of aberrations and the overall size of the optics.

Although the embodiments described hereinabove are shown with a single one-dimensional array of non-equally spaced optical ports, other or the same embodiments may utilize two-dimensional port arrays. According to the invention, such two-dimensional arrays of ports include one or more rows of in which at least three consecutive ports are non-equally spaced, with a middle optical port located closer to one of adjacent ports in the respective row than to the other opposite adjacent port in the same row, so as to provide space for beam offset for attenuation at one side of the selected port.

Figure 9:
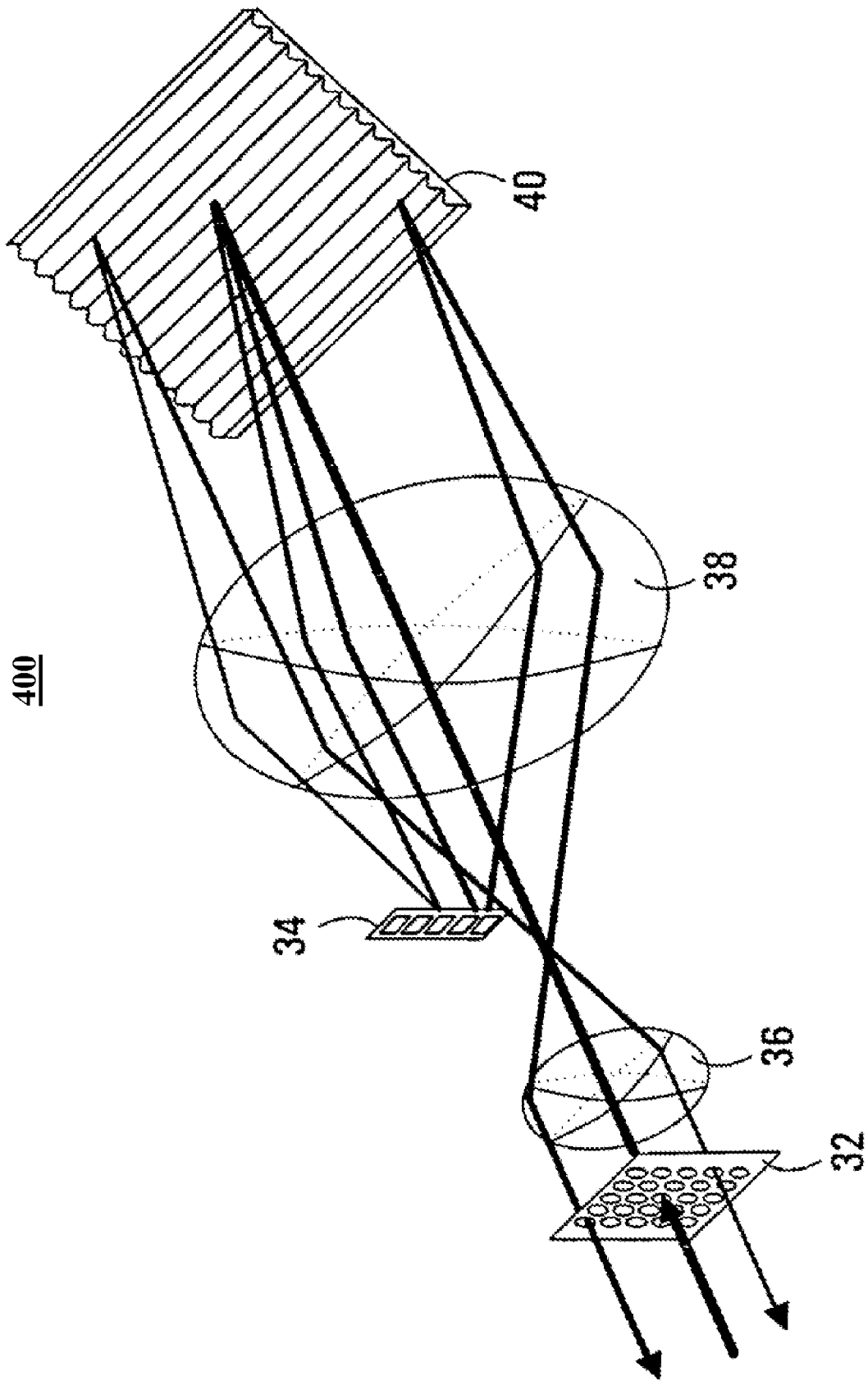
FIG. 9 is a is a schematic perspective view of a multiport optical routing device with optical ports forming a two-dimensional array.

FIG. 9 illustrate a prior art WSS 400 with a large number of optical ports disposed in a two-dimensional array, which is a variant of a system taught in U.S. Pat. No. 6,549,699 to Belser et al, and is described in the U.S. Pat, Application No 2006/0245685 to Ducellier et al, which is incorporated herein by reference.

A two dimensional arrangement of optical ports consisting of a two dimensional array of fibres 30 connected to a two dimensional array of micro-lenses 32 to substantially collimate/focus light beams as they emerged/are coupled to the optical fibres is optically coupled to an array of MEMS switching elements 34 capable of directing light beams in both the plane of dispersion and the plane perpendicular to the plane of dispersion. As shown in FIG. 9, the ports are arranged in a regular equally spaced N×N array, enabling one input and $N^2$ potential outputs.

In operation, a light beam containing multiple wavelengths is input through the middle optical port, is collimated by the middle micro-lens and is directed to the diffraction through a telescope arrangement consisting of a coupling lens 36 and a main lens 38. After reflecting from a diffraction grating, the light beam is demultiplexed into a plurality of wavelength channels, each impinging on a corresponding MEMS switch element 34. This MEMS can tilt both in the plane of the dispersion and in the plane perpendicular to the dispersion plane to route the wavelength channels to alternate locations on the diffraction grating 40. The images of these alternate locations through the telescope can be made to precisely align to one of the micro-lens of the two dimensional array 32, thus each wavelength channel is made to couple to a selectable optical port.

Figure 10A:
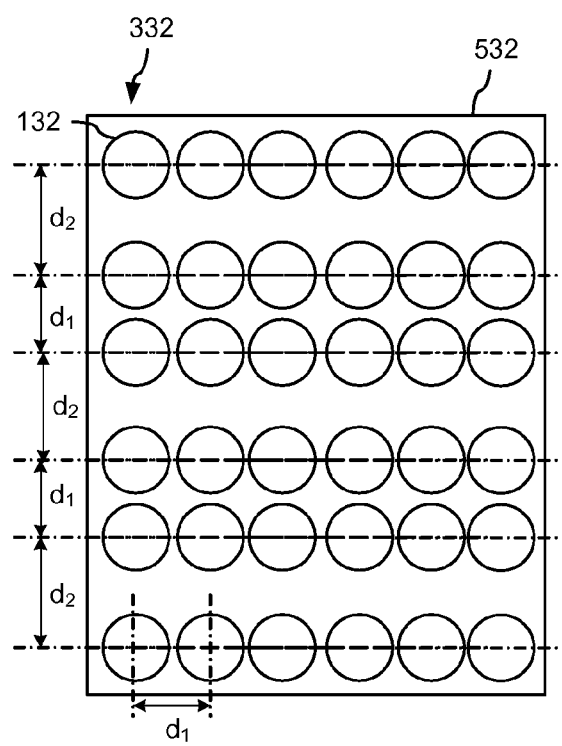
FIGS. 10A and 10B are a schematic representations of end-on and side views of one embodiment of a front-end unit having non-equally spaced optical ports arranged in a two-dimensional array for use in the multiport optical routing device platform illustrated in FIG. 9.
Figure 10B:
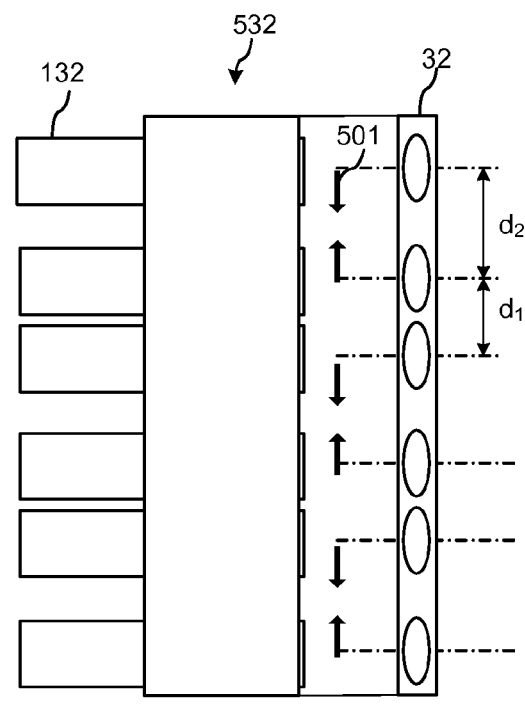

According to one embodiment of the present invention, the regular two-dimensional array of micro-lenses 32, and the coupled thereto regular two-dimensional array of equally spaced fiber ports of the WSS 400 is replaced by a FAU 532, which is shown in FIGS. 10A and 10B in orthogonal views. The FAU 532 incorporates a two-dimensional array of optical ports having 6 vertically oriented rows 332 of non-equally spaced ports 132, wherein each three consecutive ports have a middle port disposed farther from one of its adjacent ports in the respective row than from the other, thereby providing a space for beam offset for attenuation without inducing inter-port crosstalk beyond a pre-defined small level. Preferably, each row or column of the of the two-dimensional array of optical ports includes at least three consecutive ports that are non-equally spaced so that consecutive distances between adjacent ports in a row vary by at least 10% along the row. Note that in the context of this specification the terms "row" and "column" are interchangeable. An optional two-dimensional array of micro-lenses 32 is further provided, wherein each micro-lens is aligned with a corresponding optical port and therefore is disposed at differing distances from two adjacent micro-lenses, so that the two-dimensional array of micro-lenses 32 is non-equally spaced in the same way as the array of optical ports 132. Note that other patterns of non-equally spaced ports, for example providing reduction in maximum switching distance in both dimensions of the port array can also be envisioned within the scope of the present invention.

Accordingly, one aspect of the invention provides a multi-port optical routing device for routing and modifying an optical signal, such as the WSS 200 or 300, which has a plurality of output ports disposed in at least one row, and wherein ports within said row of ports are grouped in pairs such as pairs of ports 451, 452 as shown in FIG. 8A, wherein the port separation $d_1$ 461 between ports within a same pair of ports is at least 10% smaller than a larger port separation $d_2$ 462 between adjacent ports from different pairs of optical ports and wherein the beam director 126, 20 or 34 is operable to direct the light beam to impinge at a side of a selected optical port with the larger separation $d_2$ between ports as illustrated in FIG. 3D so as to provide a controllable degree of attenuation for light coupled into the selected output optical port without coupling light into adjacent optical ports.

It will be appreciated that the shown embodiments may be modified in many different ways within the scope of the present invention while still providing the benefits of the non-equal spacing of the optical ports, and still other embodiments may be contemplated.

For example, although the invention is explained hereinabove with reference to the embodiments of FIGS. 5-7, which utilize a single diffractive element operating in a double-path configuration and a single mirror array, the inventors contemplate that the present invention can be practiced using alternative embodiments such as single-path configurations having two beam directors and two dispersive elements, or in embodiments without dispersive elements wherein beams are routed by one or more beam directors between two or more port arrays. As another example, an LCoS array can be used as the beam director instead of a MEMS array. Furthermore, wavelength dispersive elements other than bulk gratings, such as prisms and array waveguide gratings (AWG) can also be utilized.

It should also be understood that each of the preceding embodiments of the present invention may utilize a portion of another embodiment Of course numerous other embodiments may be envisioned without departing from the spirit and scope of the invention.

We claim:

1. A multiport optical routing device for routing and modifying an optical signal, comprising:
   an input optical port for receiving the optical signal;
   a plurality of output optical ports disposed in a row comprising first, second and third consecutive output optical ports; and,
   a beam director optically coupled to the input optical port for receiving at least a portion of the optical signal therefrom and for directing said at least a portion of the optical signal as a light beam at an angle controlled by the beam director for coupling into one of the output optical ports;
   wherein the first, second and third consecutive output optical ports are non-uniformly spaced with a first distance $d_1$ between the first and second output optical ports that differs from a second distance $d_2$ between the second and third output optical ports by at least 10%.

2. The device of claim 1, wherein each three consecutive output optical ports from the plurality of output optical ports are non-equally spaced with inter-port distances between adjacent output optical ports differing by at least 10%.

3. The device of claim 1, wherein each of the output optical ports having two adjacent output optical ports at opposite sides thereof is at least 10% further away from one of the adjacent output optical ports than from the other of the two adjacent output optical ports.

4. The device of claim 2, wherein a ratio of the second distance $d_2$ to the first distance $d_1$ is between 1.2 and 1.6 inclusive.

5. The device of claim 2, wherein the first distance $d_1$ is between 100 µm and 150 µm, and $d_2$ is between 150 and 300 µm.

6. The device of claim 2, wherein the first distances $d_1$ is between 200 and 300 µm, and $d_2$ is between 300 and 600 µm.

7. The device of claim 1, further comprising a switching lens having a first optical axis for converting an angular displacement of the light beam arriving from the beam director into a lateral displacement corresponding to a position of a selected one of the plurality of output optical ports.

8. The device of claim 7, wherein the beam director is operable to control the angle of the light beam so as to direct the light beam along an optical path towards the second output optical port for coupling thereinto, and is further operable to change the angle so as to at least partially shift the light beam away from an alignment with the second output optical port towards one of the first and third output optical ports that is distanced farther away from the second output optical port so as to provide a controllable optical loss for light coupled into the second output optical port without causing light of the light beam to leak into adjacent optical ports.

9. The device of claim 8, further comprising a wavelength dispersing element defining a dispersion plane for dispersing the optical signal received from the input optical port into a plurality of light beams having different central wavelengths, wherein the optical beam director comprises an actuation array for selectively deflecting one or more of the light beams along optical paths in a switching plane at one or more angles controlled by the beam director for coupling into selected output optical ports with controllable beam offsets.

10. The device of claim 9, wherein the wavelength dispersing element comprises one of a dispersion grating, a prism, and an array waveguide grating (AWG).

11. The device of claim 9, wherein the actuation array comprises a micro-electromechanical systems (MEMS) device.

12. The device of claim 9, wherein the actuation array comprises a liquid crystal phase array.

13. The device of claim 7, further including a fiber array comprising a plurality of fibers coupled to the input port and the plurality of output ports for transmitting and receiving optical signals, respectively.

14. The device of claim 1, wherein the plurality of output optical ports forms one row of a two-dimensional array of optical ports, wherein each row thereof comprises at least three consecutive output optical ports that are non-equally spaced so that consecutive distances between adjacent output optical ports in a row vary by at least 10% along the row.

* * * * *